(12) United States Patent
Kim et al.

(10) Patent No.: US 12,479,514 B2
(45) Date of Patent: Nov. 25, 2025

(54) DASHBOARD PANEL VEHICLE-BODY STRUCTURE WITH ENHANCED LOAD PATH CONNECTIVITY

(71) Applicants: Hyundai Motor Company, Seoul (KR); Kia Corporation, Seoul (KR)

(72) Inventors: Seong Joon Kim, Seoul (KR); Hyung Tae Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 344 days.

(21) Appl. No.: 18/062,045

(22) Filed: Dec. 6, 2022

(65) Prior Publication Data

US 2023/0278640 A1    Sep. 7, 2023

(30) Foreign Application Priority Data

Mar. 2, 2022 (KR) .................. 10-2022-0026519

(51) Int. Cl.
    *B62D 25/14* (2006.01)
    *B62D 21/15* (2006.01)
    *B62D 25/20* (2006.01)

(52) U.S. Cl.
    CPC ....... *B62D 25/145* (2013.01); *B62D 25/2018* (2013.01); *B62D 21/15* (2013.01)

(58) Field of Classification Search
    CPC .... B62D 25/14; B62D 25/145; B62D 25/147; B62D 25/08; B62D 25/04; B62D 25/2045; B62D 25/2036; B62D 25/2018; B62D 21/15; B62D 21/152; B62D 21/155; B62D 21/157

USPC ...... 296/187.12, 187.08, 187.1, 193.06, 191, 296/203.02, 203.03, 70

See application file for complete search history.

(56) References Cited

U.S. PATENT DOCUMENTS

| | | | | |
|---|---|---|---|---|
| 6,364,401 | B1* | 4/2002 | Kim ................... | B62D 25/04 |
| | | | | 296/203.02 |
| 7,059,667 | B2* | 6/2006 | Tomita ................ | B62D 25/082 |
| | | | | 296/203.03 |
| 8,801,082 | B2* | 8/2014 | Naoi ..................... | B62D 25/14 |
| | | | | 296/70 |
| 9,266,568 | B2* | 2/2016 | Nishino ............. | B62D 25/2045 |
| 9,643,654 | B2* | 5/2017 | Furusaki ........... | B62D 25/2018 |
| 9,643,659 | B2* | 5/2017 | Ohigashi ........... | B62D 25/2036 |
| 10,232,891 | B2* | 3/2019 | Yoshida ............ | B62D 25/2036 |
| 10,351,178 | B2* | 7/2019 | Han ................... | B62D 25/2045 |
| 11,027,685 | B2* | 6/2021 | Izutsu .................... | B60R 21/02 |
| 11,472,487 | B2* | 10/2022 | Nakamura .......... | B62D 25/145 |

FOREIGN PATENT DOCUMENTS

KR           101393885 B1    5/2014

* cited by examiner

*Primary Examiner* — Joseph D. Pape
*Assistant Examiner* — Denise Lynne Esquivel
(74) *Attorney, Agent, or Firm* — Fox Rothschild LLP (57) ABSTRACT

Provided is a dashboard panel vehicle-body structure with enhanced load path connectivity, the structure including a transverse member configured in such a manner that a first end portion thereof overlaps at least one portion of a front pillar of a vehicle and extends in a widthwise direction of the vehicle up to a dashboard panel, wherein the transverse member is configured to extend up to an outer edge of the front pillar.

14 Claims, 4 Drawing Sheets

[ SECTION VIEW A-A ]

[ SECTION VIEW B-B ]

FIG. 7

DASHBOARD PANEL VEHICLE-BODY STRUCTURE WITH ENHANCED LOAD PATH CONNECTIVITY

CROSS REFERENCE TO RELATED APPLICATION

The present application claims under 35 U.S.C. § 119(a) the benefit of Korean Patent Application No. 10-2022-0026519, filed Mar. 2, 2022, the entire contents of which is incorporated herein for all purposes by this reference.

BACKGROUND

Technical Field

The present disclosure relates to a dashboard panel vehicle-body structure with enhanced load path connectivity and, more particularly, to a dashboard panel vehicle-body structure with enhanced load path connectivity, in which a transverse member is used, a first end portion thereof overlapping at least one portion of a front pillar and a second end portion thereof passing through a dashboard panel and being connected to a floor side member.

Background

Usually, a frame-body frame and a front frame constituting an engine room in front of the frame-body frame are connected to a vehicle body. The vehicle-body frame is configured with a floor, constituting a lower portion thereof, and a side frame. Front side frames extend backward from the front frame and are connected to vehicle-body side frames, respectively.

A dashboard panel is mounted between the vehicle-body frame and the front frame. The dashboard panel separates an engine room and an in-vehicle space from each other and prevents an engine and other components in the engine room from being pushed into the in-vehicle space when a collision occurs. In the case of the dashboard panel, there is a need to secure various types of rigidity to provide a cushion against a collision. To this end, a plurality of members is attached to the dashboard panel to enhance the rigidity of the dashboard panel.

In the related art, a load path is provided for efficiently distributing an impact load in order to optimize a structure of a dashboard member in a manner that improves performance of protection against a vehicle collision. That is, in order to provide the load path for distributing the impact load when a collision occurs, a separate enhancing member is mounted at the point of inflection for the load path on the vehicle-body floor in such a manner as to provide a cushion against head-on and offset collisions, and a separate enhancing member is mounted on a vehicle-body side in such a manner as to provide a cushion against offset and small overlap collisions. In addition, a transverse enhancing member for minimizing dashboard deformation and connecting a side member of the floor and an A-pillar to each other is mounted inside the vehicle.

However, a simple local enhancement that varies according to a collision mode complicates a structure of the vehicle and increases the number of components thereof. In addition, insufficient connectivity among the enhancing members that are locally mounted decreases the efficiency of the load path along which a collision load is transferred and the efficiency of connection among parts of a vehicle body.

The foregoing is intended merely to aid in the understanding of the background of the present disclosure, and is not intended to mean that the present disclosure falls within the purview of the related art that is already known to those skilled in the art.

SUMMARY

An objective of the present disclosure, which is made to solve the above-mentioned problems, is to provide a dashboard panel vehicle-body structure, in which a transverse member is used, a first end portion thereof overlapping at least one portion of a front pillar and a second end portion thereof passing through a dashboard panel and being connected to a floor side member.

In one aspect, a dashboard panel vehicle-body structure is provided, the structure comprising: a transverse member configured that a first end portion thereof is configured to overlap at least one portion of a front pillar of a vehicle and is configured to extend in a widthwise direction of the vehicle up to a dashboard panel, wherein the transverse member is configured to extend up to an outer edge of the front pillar.

Another objective of the present disclosure is to provide a dashboard panel vehicle-body structure preferably with enhanced load path connectivity, in which a transverse member is inserted into a dashboard panel, in a manner that passes therethrough, and is connected to a floor side member and in which the floor side member is connected a side sill. This dashboard panel vehicle-body structure is capable of distributing an impact load occurring in the front side of a vehicle to a vehicle side system.

The present disclosure is not limited to the above-mentioned objectives. Objective other than the above-mentioned objectives would be clearly understood from the following description of an embodiment of the present disclosure. In addition, the objectives of the present disclosure will be accomplished by limitations recited in claims or a combination thereof.

In order to accomplish the above-described objectives ofthe present disclosure, a dashboard panel vehicle-body structure with enhanced load path connectivity is configured as follows.

According to an aspect of the present disclosure, there is provided a dashboard panel vehicle-body structure with enhanced load path connectivity, the structure including: a transverse member configured in such a manner that a first end portion thereof overlaps at least one portion of a front pillar of a vehicle and extends in a widthwise direction of the vehicle up to a dashboard panel, wherein the transverse member is configured to extend up to an outer edge of the front pillar.

The dashboard panel vehicle-body structure may further include a floor side member extending to behind a front side member of the vehicle, wherein the front side member may be configured to be connected to a side sill of the vehicle.

The transverse member may be configured to cause an impact load to pass along a path to the front pillar in a case where the impact load is applied to the floor side member.

The floor side member may be configured in such a manner that a first end portion thereof is connected to the transverse member and that a second end portion thereof is connected to a side sill of the vehicle.

In the dashboard panel vehicle-body structure, the transverse member may be configured in such a manner that a first end portion passes through the front pillar and that a second end portion thereof passes through the dashboard panel.

The dashboard panel vehicle-body structure may further include a first enhancing member configured to be positioned on the same plane inside the front pillar as the transverse member and to be connected to the transverse member passing through the front pillar.

The first enhancing member may be formed at a position corresponding to the first end portion of the transverse member.

The transverse member may be formed in such a manner that the first end portion thereof is positioned at the same position in the height direction as the first enhancing member.

In the dashboard panel vehicle-body structure, the dashboard panel may include an upper dashboard panel; and a lower dashboard panel formed under the upper dashboard panel, wherein the transverse member may be configured in such a manner that at least one portion thereof is inserted between the upper dashboard panel and the lower dashboard panel.

The dashboard panel vehicle-body structure may further include a second enhancing member configured to be positioned above the floor side member and to be connected to the transverse member inserted into the lower dashboard panel.

The second enhancing member may be formed at a position corresponding to the second end portion of the transverse member.

In the dashboard panel vehicle-body structure, the transverse member is configured to cause an impact load to pass along a path to the front pillar in a case where the impact load is applied to the floor side member.

In the dashboard panel vehicle-body structure, the second enhancing member may be configured to be positioned over the floor side member in such a manner that a first end portion thereof is connected to a rear end portion of the front side member.

According to the present disclosure, the following advantageous effects can be achieved according to the above-mentioned aspect of the present disclosure and with constituent elements, a combination thereof, and an application-based relationship therebetween that will be described below.

The transverse member is configured in such a manner that the first end portion thereof overlaps at least one portion of the front pillar and that the second end portion thereof passes through the dashboard panel and is connected to the floor side member. Thus, the advantageous effect of enhancing load path connectivity and efficiently distributing the impact load can be achieved.

In addition, the first enhancing member and the second enhancing member are configured to be connected to the transverse member. Thus, the advantageous effect of enhancing the connectivity between a floor system and a side system and securing the rigidities of parts of a vehicle body can be achieved.

In addition, the transverse member is configured to pass through the dashboard panel and the front pillar. With this configuration, when a collision occurs, not only does the first enhancing member and the second enhancing member function independent of each other, but the load path connectivity is also improved. Accordingly, a structure of a vehicle can be simplified, and the number of components thereof can be decreased. Thus, the advantageous effect of reducing weight of the vehicle can be achieved.

In another embodiment, vehicles are provided that comprise an apparatus as disclosed herein.

In one aspect, a vehicle is provided that comprises: (a) a front pillar; and (b) a dashboard panel vehicle-body structure comprising (i) a transverse member comprising a first end portion thereof that overlaps at least one portion of the vehicle front pillar and is configured to extend in a widthwise direction of the vehicle up to a dashboard panel, wherein the transverse member is configured to extend up to an outer edge of the front pillar.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

An embodiment of the present disclosure will be described in more detail below with reference to the accompanying drawings. The embodiment of the present disclosure will be modified in various forms, and the scope of the present disclosure should not be interpreted as being limited to the following embodiment. The embodiment is described in sufficient detail to enable a person of ordinary skill in the art to make and use the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g.

fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

In addition, throughout the present specification, the terms "member", "panel", and the like that are used to name a constituent element means a unit that performs at least one function or operation and may be realized as a hardware component or a combination of hardware components.

In addition, throughout the present specification, the terms "upper end," and "lower end" are defined with respect to the height direction on the drawings.

In addition, in order to distinguish among constituent elements that have the same name, the terms first, second, and so on are used throughout the present specification. In the following description, no limitation to the order of the terms is necessarily imposed.

In addition, throughout the present specification, the "height direction", "widthwise direction", and "lengthwise direction" are defined with respect to a vehicle.

In addition, throughout the present specification, when a component is "over" a different component, this means that a third component may be positioned therebetween, and when a component is "on the top of" a different component, this means that the component is vertically in contact with an upper surface of the different component. Furthermore, throughout the present specification, when a constituent element is "under" a different constituent element, this means that a third component may be positioned therebetween, and, when a constituent element is "on the bottom of" a different constituent element, this means that a constituent element is vertically in contact with a lower surface of a different constituent element.

Figure 1:
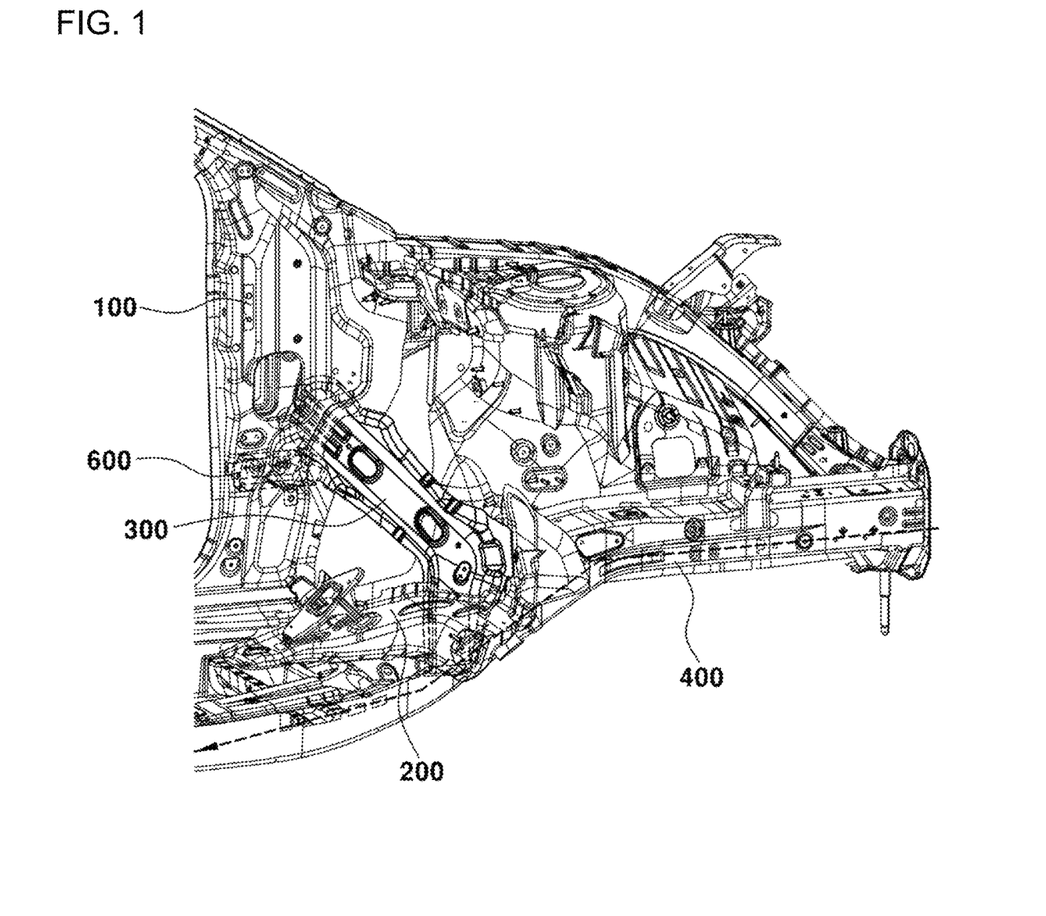
FIG. 1 is a view illustrating a load path direction in a dashboard panel vehicle-body structure with enhanced load path connectivity according to an embodiment of the present disclosure.
Figure 2:
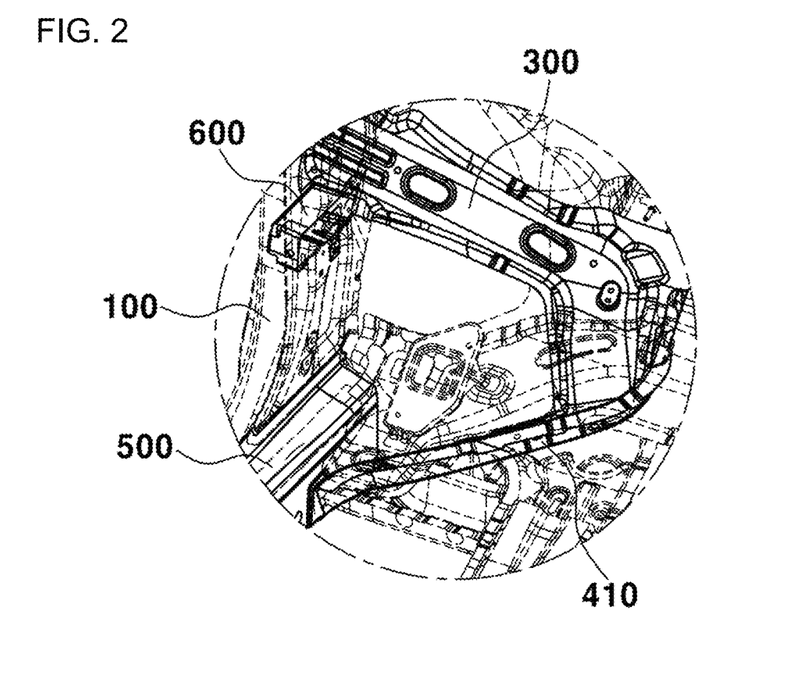
FIG. 2 is a view illustrating a connection relationship between first and second end portions of the transverse member of the dashboard panel vehicle-body structure with enhanced load path connectivity according to the embodiment of the present disclosure.

FIG. 1 is a view illustrating a load path direction in a dashboard panel vehicle-body structure with enhanced load path connectivity according to an embodiment of the present disclosure. FIG. 2 is a view illustrating a connection relationship between first and second end portions of a transverse member of the dashboard panel vehicle-body structure with enhanced load path connectivity according to the embodiment of the present disclosure.

With reference to FIGS. 1 and 2, the dashboard panel vehicle-body structure with enhanced load path connectivity according to the embodiment of the present disclosure may be configured to include a front pillar 100, a dashboard panel 200, a transverse member 300, and a floor side member 400.

In the case of a vehicle in which the present disclosure finds application, an engine room is formed in a front portion of a vehicle-body frame in which an in-vehicle space is formed. The dashboard panel 200 is attached, along a widthwise direction of the vehicle-body frame, over a portion of the vehicle-body frame in which the front pillar 100 is formed. Thus, the dashboard panel 200 is positioned, as a partition, between the engine room and the in-vehicle space. A side sill 500 may be formed on respective portions of both left and right lateral surfaces of the vehicle-body frame. The side sill 500 may be configured to be positioned underneath the front pillar 100 and be connected to the floor side member 400.

The transverse member 300 may be formed to extend, in a widthwise direction of a vehicle, from the front pillar 100 up to the dashboard panel 200. More desirably, the transverse member 300 may be configured in such a manner that a first end portion thereof overlaps at least one portion of the front pillar 100 and extends in the widthwise direction of the vehicle up to the dashboard panel 200.

The transverse member 300 may be configured in such a manner that the first end portion thereof passes through the front pillar 100 and that a second end portion thereof passes through the dashboard panel 200. More specifically, the transverse member 300 may be configured in such a manner that the first end portion thereof is inserted into the front pillar 100 in a manner that passes therethrough. The transverse member 300 may be configured in such a manner that the first end portion thereof passes through the front pillar 100 and overlaps at least one portion of the front pillar 100. More desirably, the transverse member 300 may be formed in such a manner that the first end portion thereof passes through the front pillar 100 and extends to be connected to an internal surface of the front pillar 100 that faces toward the outside of the vehicle.

A trim line of an external surface of the front pillar 100 that faces toward the inside of the vehicle may be formed in a manner that corresponds to a section into which the transverse member 300 is inserted. In other words, the trim line corresponding to a shape of the transverse member 300 may be formed in a portion of the front pillar 100 into which the transverse member 300 is inserted. Thus, a wedge-shaped structure is formed in the front pillar 100.

A first enhancing member 600 may be formed at a position corresponding to the first end portion of the transverse member 300. The transverse member 300 may be formed in such a manner that the first end portion thereof is positioned at the same position in the height direction as the first enhancing member 600. The first enhancing member 600 may be configured in such a manner as to be connected to the first end portion of the transverse member 300 and thus to improve the load path connectivity when a collision occurs.

The transverse member 300 may be configured in such a manner that the second end portion thereof is inserted into the dashboard panel 200 in a manner that passes therethrough. The transverse member 300 may be configured in such a manner that the second end portion thereof passes through the dashboard panel 200 in a manner that overlaps at least one portion of the dashboard panel 200. More desirably, the transverse member 300 may be formed in such a manner that the second end portion thereof passes through the dashboard panel 200 and extends to be connected to the floor side member 400.

A second enhancing member 700 may be formed at a position corresponding to the second end portion of the transverse member 300. The transverse member 300 may be configured in such a manner that the second end portion thereof is connected to the second enhancing member 700. The second enhancing member 700 may be configured to be connected to the second end portion of the transverse member 300 and thus to decrease a magnitude of a collision load when a collision occurs.

The floor side member 400 may be configured in such a manner that a first end portion thereof is connected to the transverse member 300 and that a second end portion thereof is connected to the side sill 500 of the vehicle. More desirably, the floor side member 400 may be configured in such a manner that the first one end thereof is connected to the second end portion of the transverse member 300. The floor side member 400 may be configured in such a manner as to be bent at a portion thereof connected to the transverse member 300 and to extend in a lengthwise direction thereof for connection to the side sill 500.

More specifically, the floor side member 400 may be configured to extend behind a front side member 410 of the vehicle and to be connected to the second end portion of the transverse member 300. The front side member 410 may be configured to be connected to the side sill 500 of the vehicle.

The dashboard panel vehicle-body structure with enhanced load path connectivity according to the embodiment of the present disclosure may be configured in such a manner that the transverse member 300 causes an impact load to pass along a path to the front pillar 100 in a case where the impact load is applied to the floor side member 400. In other words, the dashboard panel vehicle-body structure with enhanced load path connectivity may be configured in such a manner that the first end portion of the transverse member 300 and the second end portion of the transverse member 300 pass through the front pillar 100 and the dashboard panel 200, respectively, and are connected to the first enhancing member 600 and the second enhancing member 700, respectively, thereby enhancing the load path connectivity. The second enhancing member 700 may be configured to be positioned over the floor side member 400 in such a manner that a first end portion thereof is connected to a rear end portion of the front side member 410.

In a case where the collision load due to a vehicle collision is applied to the floor side member 400, the second enhancing member 700 may decrease the magnitude of the collision load and thus may secure the rigidity of the floor side member 400. In addition, a load path is formed. Along the load path, the collision load applied to the floor side member 400 is transferred to the second enhancing member 700 and the transverse member 300 connected to the second enhancing member 700, and the transferred collision load is transferred to the side sill 500 connected to the floor side member 400.

This load path extends up through the second enhancing member 700 to the transverse member 300, and thus the collision load is transferred to the side sill 500, thereby impacting a portion of the side sill 500. The collision load is absorbed and thus cushioned by the second enhancing member 700. Thus, a magnitude of the collision load transferred to the side sill 500 may be decreased.

The collision load applied to the floor side member 400 and then transferred to the transverse to member 300 may be transferred to the first enhancing member 600. The first enhancing member 600 may be configured to absorb and cushion the collision load to be transferred. A load path over which the collision load transferred to the transverse member 300 is transferred to the front pillar 100 connected to the transverse member 300 is formed. Due to this load path, the collision load is absorbed and thus cushioned by the first enhancing member 600, and thus the magnitude of the collision load transferred to the front pillar 100 may be decreased.

Due to the load paths formed in two directions with respect to the transverse member 300, the collision load transferred to a vehicle body may be distributed. In addition, the connectivity between parts of the vehicle body may be enhanced.

Figure 3:
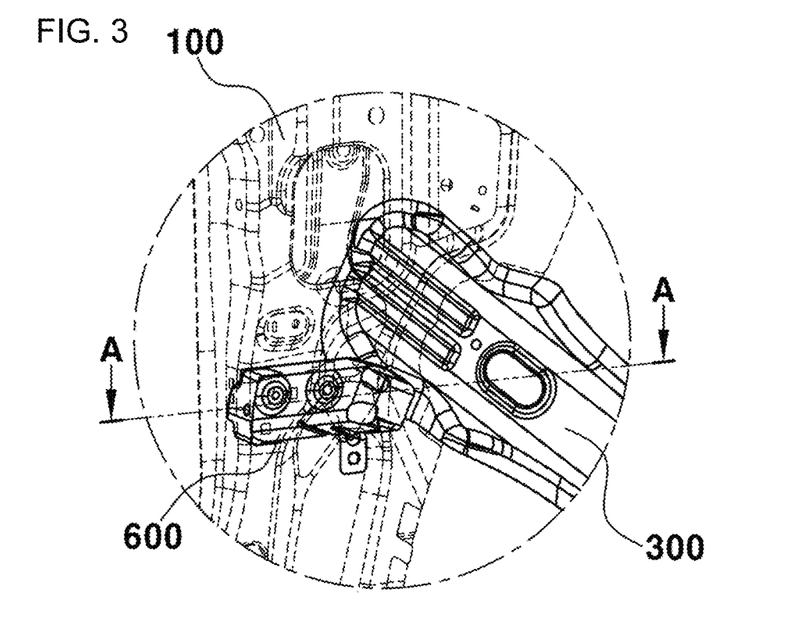
FIG. 3 is a view illustrating the first end portion of the transverse member and a first enhancing member of the dashboard panel vehicle-body structure with enhanced load path connectivity according to the embodiment of the present disclosure.
Figure 4:
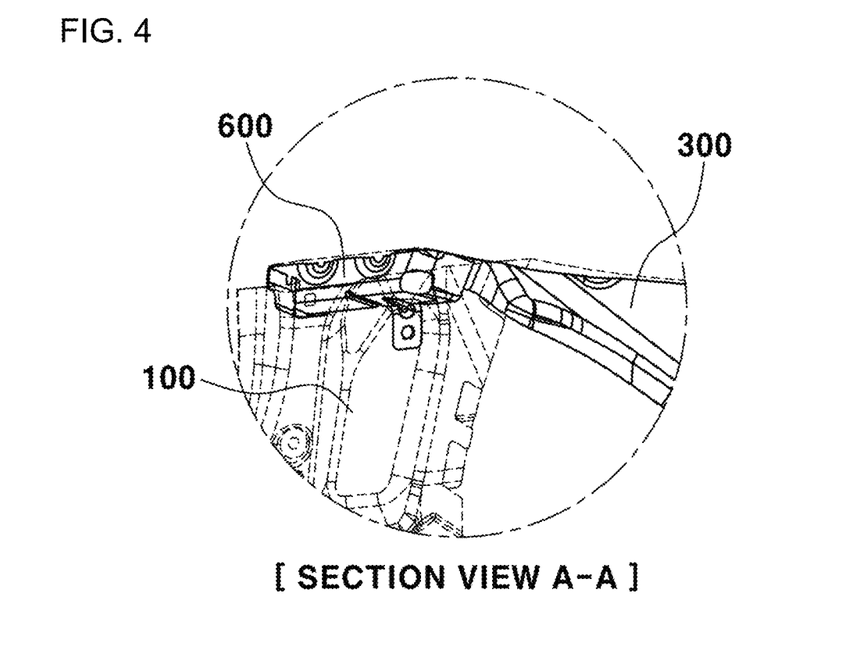
FIG. 4 is a cross-sectional view taken along line A-A on the dashboard panel vehicle-body structure with enhanced load path connectivity according to the embodiment of the present disclosure in FIG. 3.

FIG. 3 is a view illustrating the first end portion of the transverse member 300 and the first enhancing member 600 of the dashboard panel vehicle-body structure with enhanced load path connectivity according to the embodiment of the present disclosure. FIG. 4 is a cross-sectional view taken along line A-A on the dashboard panel vehicle-body structure with enhanced load path connectivity according to the embodiment of the present disclosure in FIG. 3.

With reference to FIGS. 3 and 4, the dashboard panel vehicle-body structure with enhanced load path connectivity according to the embodiment of the present disclosure may be configured to further include the first enhancing member 600 that is configured to be positioned on the same plane inside the front pillar 100 as the transverse member 300 and to be connected to the transverse member 300 passing through the front pillar 100.

The first enhancing member 600 may be configured to be positioned inside the front pillar 100 and to be connected to the transverse member 300 passing through the front pillar 100. The first enhancing member 600 may be configured to form a double enhancing structure. That is, the first enhancing member 600 may be formed inside the front pillar 100 to enhance the rigidity of the front pillar 100, and at the same time at least one portion thereof may be connected to the transverse member 300 to improve the rigidity through load distribution.

The first enhancing member 600 may be configured to extend in a widthwise direction of the front pillar 100 in such a manner that the first end portion thereof is connected to the transverse member 300. The first end portion of the first enhancing member 600 may be connected to the transverse member 300 by being inserted thereinto.

The transverse member 300 may be configured in such a manner that the first end portion thereof is positioned on the same plane as the first enhancing member 600. More desirably, the first end portion of the transverse member 300 may be arranged at the same position as the first end portion of the first enhancing member 600 in such a manner as to be connected to the first enhancing member 600. Accordingly, a load path over which the collision load to be transferred to the transverse member 300 is transferred to the first enhancing member 600 may be formed.

The transverse member 300 may be inserted into the front pillar 100 in such a manner as to overlap at least one portion of the front pillar 100. As a practical example, the first end portion of the transverse member 300 may be inserted into the front pillar 100 in such a manner as to be brought into contact with an internal surface thereof. As another practical example, the first end portion of the transverse member 300 may be inserted into the front pillar 100 in such a manner as not to be brought into contact with the internal surface thereof.

Figure 5:
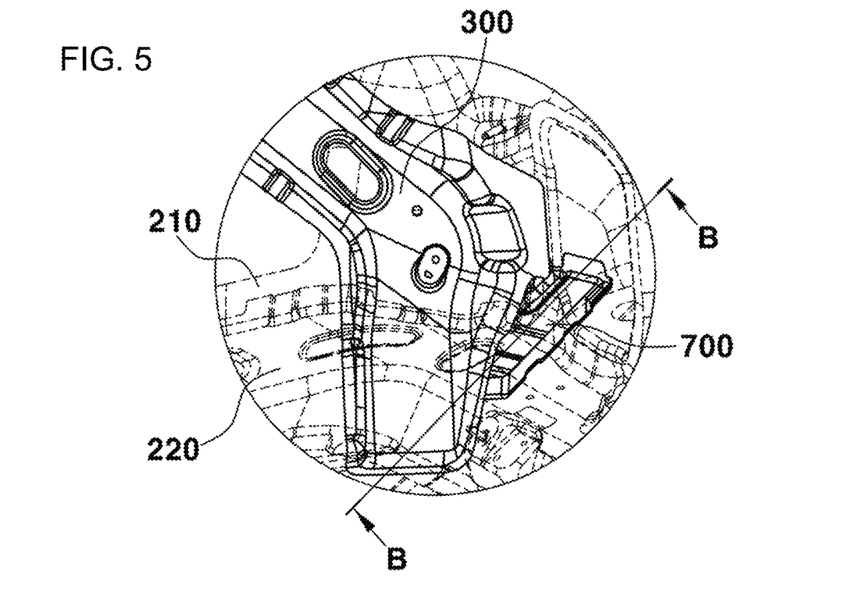
FIG. 5 is a view illustrating the second end portion of the transverse member and a second enhancing member of the dashboard panel vehicle-body structure with enhanced load path connectivity according to the embodiment of the present disclosure.
Figure 6:
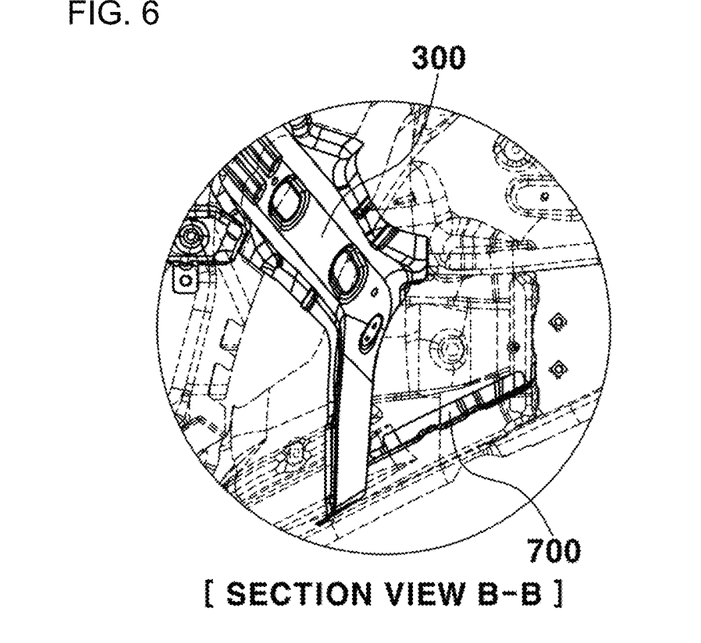
FIG. 6 is a cross-sectional view taken along line B-B on the dashboard panel vehicle-body structure with enhanced load path connectivity according to the embodiment of the present disclosure in FIG. 5.
Figure 7:
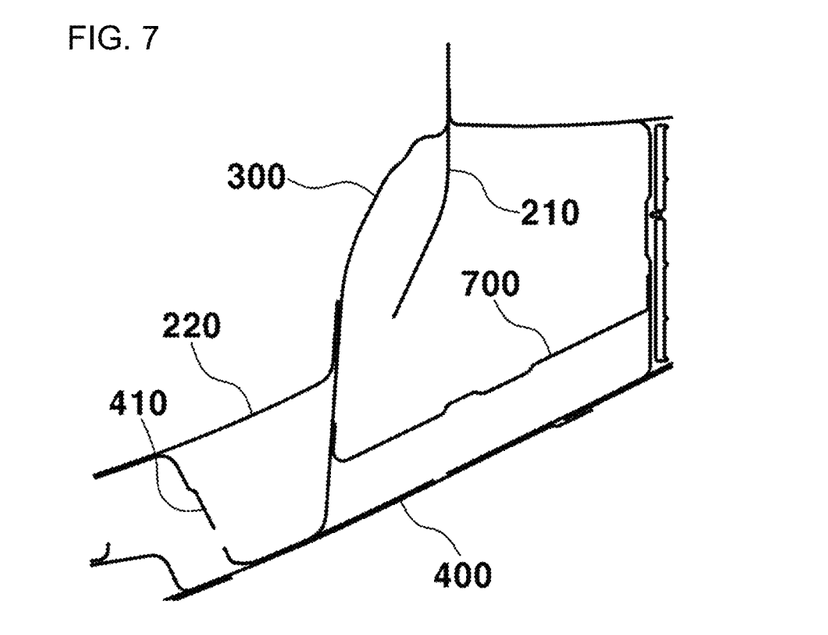
FIG. 7 is a cross-sectional view illustrating the dashboard panel vehicle-body structure with enhanced load path connectivity according to the embodiment of the present disclosure.

FIG. 5 is a view illustrating the second end portion of the transverse member 300 and the second enhancing member 700 of the dashboard panel vehicle-body structure with enhanced load path connectivity according to the embodiment of the present disclosure. FIG. 6 is a cross-sectional view taken along line B-B on the dashboard panel vehicle-body structure with enhanced load path connectivity according to the embodiment of the present disclosure in FIG. 5. FIG. 7 is a cross-sectional view illustrating the dashboard panel vehicle-body structure with enhanced load path connectivity according to the embodiment of the present disclosure.

With reference to FIGS. 5 to 7, the dashboard panel 200 may be configured with an upper dashboard panel 210 and a lower dashboard panel 220. More desirably, the dashboard panel 200 may be configured with the upper dashboard panel 210 and the lower dashboard panel 220 formed under the upper dashboard panel 210, and the transverse member 300 may be configured in such a manner that at least one portion thereof is inserted into between the lower dashboard panel 220 and the upper dashboard panel 210.

The transverse member 300 is configured to be inserted into the dashboard panel 200 and to be connected to the second enhancing member 700 and the floor side member 400. To this end, the dashboard panel 200 may be configured to be divided into the upper dashboard panel 210 and the lower dashboard panel 220, and the transverse member 300 may be configured to be inserted along a parting line separating the upper dashboard panel 210 and the lower dashboard panel 220.

The dashboard panel vehicle-body structure with enhanced load path connectivity according to the embodiment of the present disclosure may be configured to further include the second enhancing member 700 configured to be positioned over the floor side member 400 and to be connected to the transverse member 300 inserted into between the lower dashboard panel 220 and the upper dashboard panel 210.

The second enhancing member 700 may be formed under the lower dashboard panel 220. More desirably, the second enhancing member 700 may be positioned over the floor side member 400 and to be formed on a lower end portion of the lower dashboard panel 220.

The second enhancing member 700 may be configured to be connected to the transverse member 300 passing through the lower dashboard panel 220. The second enhancing member 700 may be configured to form the double enhancing structure. With the double enhancing structure, when a head-on collision occurs, the rigidity of the floor side member 400 is improved, and at the same time the connection of at least one portion of the floor side member 400 to the transverse member 300 enhances the rigidity thereof through the load distribution.

The second enhancing member 700 may be configured to extend in a lengthwise direction thereof in such a manner that the first end portion thereof is connected to the transverse member 300. The transverse member 300 may be configured in such a manner that the second end portion thereof is connected to the second enhancing member 700. Thus, a load path along which the collision load to be transferred to the second enhancing member 700 is transferred to the transverse member 300 may be formed.

In summary, according to an aspect of the present disclosure, the dashboard panel vehicle-body structure with enhanced load path connectivity in which the transverse member 300 is used is provided. The first end portion of the transverse member 300 overlaps at least one portion of the front pillar 100, and the second end portion thereof passes through the dashboard panel 200 and is connected to the floor side member 400.

The embodiment of the present disclosure is described above in an exemplary manner. In addition, the embodiment of the present disclosure is described above as a desired embodiment, and different modifications to the embodiment of the present disclosure and various different combinations thereof could be made under various conditions. A modification or alteration to the embodiment, as disclosed in the present specification, of the present disclosure would be made within the scope of the concept of the present disclosure, the scope of equivalents of the disclosed contents, and/or the scope of the technology or knowledge in the art. The embodiment is described above to provide an essential requirement for realizing the technical idea of the present disclosure, and various modifications, which are required in a particular technical field in which the present disclosure finds application and are required to use the present disclosure, may also be made to the embodiment. Therefore, the embodiment, as disclosed in detail above, of the present disclosure is not intended to impose any limitation to the present disclosure. In addition, the following claims should be construed as covering other embodiments as well.

What is claimed is:

1. A dashboard panel vehicle-body structure, the structure comprising:
   a transverse member configured that a first end portion thereof is configured to overlap at least one portion of a front pillar of a vehicle and is configured to extend in a widthwise direction of the vehicle up to a dashboard panel,
   wherein the transverse member is configured to pass through the front pillar and extend up to an outer edge of the front pillar.

2. The dashboard panel vehicle-body structure of claim 1, further comprising:
   a floor side member extending to behind a front side member of the vehicle,
   wherein the front side member is configured to be connected to a side sill of the vehicle.

3. The dashboard panel vehicle-body structure of claim 2, wherein the transverse member is configured to cause an impact load to pass along a path to the front pillar in a case where the impact load is applied to the floor side member.

4. The dashboard panel vehicle-body structure of claim 2, wherein the floor side member is configured in such a manner that a first end portion thereof is connected to the transverse member and that a second end portion thereof is connected to a side sill of the vehicle.

5. The dashboard panel vehicle-body structure of claim 1, wherein the transverse member is configured that a first end portion passes through the front pillar and that a second end portion thereof passes through the dashboard panel.

6. The dashboard panel vehicle-body structure of claim 5, further comprising:
   a first enhancing member configured to be positioned on the same plane inside the front pillar as the transverse member and to be connected to the transverse member passing through the front pillar.

7. The dashboard panel vehicle-body structure of claim 6, wherein the first enhancing member is formed at a position corresponding to the first end portion of the transverse member.

8. The dashboard panel vehicle-body structure of claim 6, wherein the transverse member is formed in such a manner that the first end portion thereof is positioned at the same position in the height direction as the first enhancing member.

9. The dashboard panel vehicle-body structure of claim 2, wherein the dashboard panel comprises:
   an upper dashboard panel; and
   a lower dashboard panel formed under the upper dashboard panel,
   wherein the transverse member is configured in such a manner that at least one portion thereof is inserted between the upper dashboard panel and the lower dashboard panel.

10. The dashboard panel vehicle-body structure of claim 9, further comprising:
    a second enhancing member configured to be positioned over the floor side member and to be connected to the transverse member inserted into the lower dashboard panel.

11. The dashboard panel vehicle-body structure of claim 10, wherein the second enhancing member is formed at a position corresponding to the second end portion of the transverse member.

12. The dashboard panel vehicle-body structure of claim 10, the second enhancing member is configured to be positioned over the floor side member in such a manner that a first end portion thereof is connected to a rear end portion of the front side member.

13. A vehicle comprising the dashboard panel vehicle-body structure of claim 1.

14. A vehicle comprising:
    (a) a front pillar; and
    (b) a dashboard panel vehicle-body structure comprising:
    (i) a transverse member comprising a first end portion thereof that overlaps at least one portion of the vehicle front pillar and is configured to extend in a widthwise direction of the vehicle up to a dashboard panel,
    wherein the transverse member is configured to pass through the front pillar and extend up to an outer edge of the front pillar.

* * * * *